US006634531B2

(12) United States Patent
Conte

(10) Patent No.: US 6,634,531 B2
(45) **Date of Patent: *Oct. 21, 2003**

(54) POCKETS FOR ATTACHMENT TO AMBULATORY AIDS, STROLLERS, BACKPACKS AND CHILD CARRIERS

(76) Inventor: Cynthia Conte, 948 Michie Tavern La., Charlottesville, VA (US) 22902

( * ) Notice: Subject to any disclaimer, the term of this patent is extended or adjusted under 35 U.S.C. 154(b) by 0 days.

This patent is subject to a terminal disclaimer.

(21) Appl. No.: 10/026,187

(22) Filed: Dec. 21, 2001

(65) Prior Publication Data

US 2002/0056736 A1 May 16, 2002

Related U.S. Application Data

(63) Continuation-in-part of application No. 09/507,844, filed on Feb. 22, 2000, which is a continuation-in-part of application No. 08/966,206, filed on Nov. 7, 1997, now Pat. No. 6,026,833.

(51) Int. Cl.[7] .................................................. B60R 9/00

(52) U.S. Cl. .......................... 224/407; 135/66; 135/68; 224/277; 224/572; 224/652

(58) Field of Search ................................ 224/652, 407, 224/277, 572; 135/66, 67, 68, 73; D3/10, 11; 150/107

(56) References Cited

U.S. PATENT DOCUMENTS

| | | | | | |
|---|---|---|---|---|---|
| 3,957,071 | A | | 5/1976 | Kenner | |
| 4,184,618 | A | | 1/1980 | Jones | |
| 4,295,483 | A | | 10/1981 | Smith | |
| 4,339,061 | A | | 7/1982 | Dunn | |
| 4,577,903 | A | | 3/1986 | Wells | |
| 4,676,416 | A | | 6/1987 | Harmon | |
| 4,815,764 | A | | 3/1989 | Carpenter | |
| 4,830,238 | A | | 5/1989 | Widinski | |
| 4,850,383 | A | * | 7/1989 | McBride | 135/66 |
| D316,479 | S | * | 4/1991 | Miller | D3/11 |
| 5,101,845 | A | | 4/1992 | Kravetz | |
| 5,154,331 | A | | 10/1992 | Sanders | |
| 5,340,005 | A | | 8/1994 | Woods | |
| 5,511,710 | A | | 4/1996 | Woods | |
| 5,513,789 | A | | 5/1996 | Woods | |
| 5,642,749 | A | | 7/1997 | Perryman | |
| D382,393 | S | * | 8/1997 | Tyler | D3/10 |
| 5,865,180 | A | * | 2/1999 | Sigfrid | 128/845 |
| 6,026,833 | A | | 2/2000 | Conte | |

FOREIGN PATENT DOCUMENTS

CA 500121 A * 2/1954 ................. 224/407

* cited by examiner

*Primary Examiner*—Lee Young
*Assistant Examiner*—Maerena W. Brevard
(74) *Attorney, Agent, or Firm*—Sheldon H. Parker

(57) ABSTRACT

The pocket system provides easy attachment to a variety of support surfaces, such as crutches, walkers, backpacks, etc. The system has at least one pocket having an open end to receive articles. At least one pocket securing member is attached to the back of the pocket proximate the open end to affix the pocket to a horizontal portion of the support surface. A stabilizing strap, or straps, is affixed to the back of the pocket proximate the closed end, adding stability by affixing the pocket to a vertical portion of the support surface. Preferably the stabilizing straps extend from opposite sides of the pocket for maximum security. One end of the securing members(s) and strap(s) can be permanently secured to the pocket, with the other end removably affixed through various means known in the art. Alternatively all of the methods of attachment of the pocket securing member(s) and stabilizing strap(s) can be removable.

5 Claims, 10 Drawing Sheets

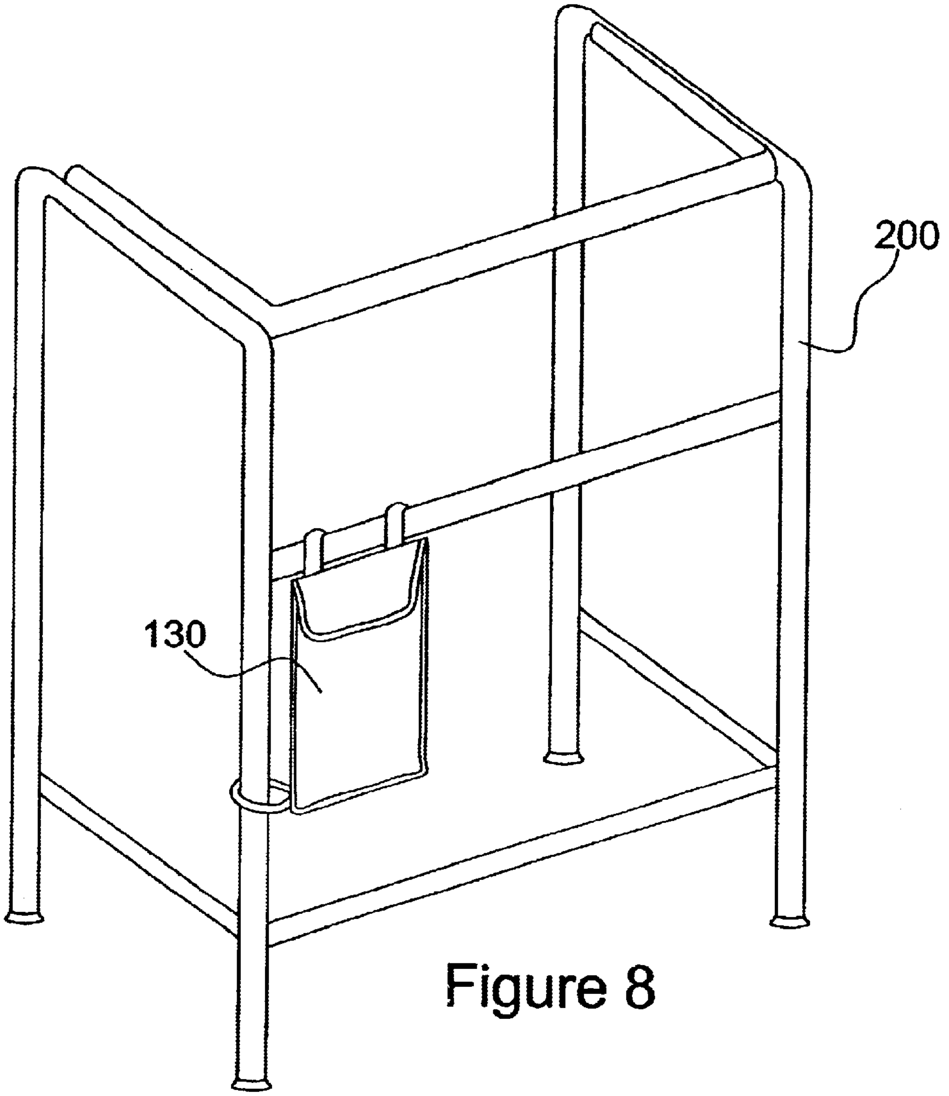
Figure 8
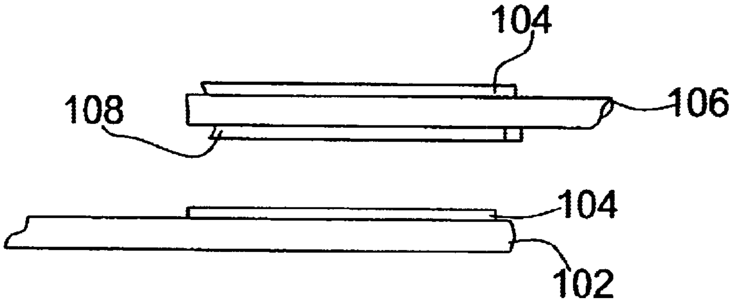
Fiaure 10

POCKETS FOR ATTACHMENT TO AMBULATORY AIDS, STROLLERS, BACKPACKS AND CHILD CARRIERS

PARENT CASE TEXT

This application is a continuation-in-part of U.S. patent application Ser. No. 09/507,844 filed on Feb. 22, 2000, which is a continuation-in-part of U.S. patent application Ser. No. 08/966,206, filed on Nov. 7, 1997 which issued as U.S. Pat. No. 6,026,833, both of which are incorporated herein by reference as if fully set forth.

BACKGROUND OF THE INVENTION

1. Field of the Invention

The present invention relates to an article carrying device adapted for attachment: to ambulatory aids such as crutches, walkers and wheelchairs; to backpacks such as internal and external frame packs and bookbags; to devices for easily transporting small children such as strollers and backpack child carriers; to bicycles and motorcycles where a vertical cross brace is adjacent to a horizontal cross brace; or to the belt or belt loops of pants.

2. Description of the Prior Art

Various items have been used for years to assist and/or transport ambulatory patients. These items have included crutches, wheelchairs and walkers. Similarly, several items have been used to transport small children, including child strollers and backpack carriers. While meant to carry people, these devices have traditionally lacked the capability to carry other items.

Various devices have been developed over the years to solve this problem of difficulty in carrying items when ambulatory or carrying children. In particular, numerous devices have been developed to assist in carrying items when using crutches. These devices include various pouches attached to the crutch such as shown in U.S. Pat. No. 4,295,483 to Smith. The Smith pouch, however, is mounted below the handle which limits easy access to the pouch by the crutch user. This location also decreases the security of the pouch as the location allows accessibility by other people.

U.S. Pat. No. 5,101,845 addresses the transport of paper articles in combination with crutches. However the clamping device shown therein appears to be relatively cumbersome and requires modification to the crutch proper. Such structures could interfere with the crutch assisted ambulatory movement of the user. The '845 patent also requires significant modification to the crutch structure which will increase the cost. Such devices may not be used by one-time users who are renting crutches as permanent modifications cannot be made to such leased crutches.

In U.S. Pat. No. 5,642,749 Perryman discloses a crutch pouch for transporting personal items, as well as documents, which is easily released from the crutch sides. As the Perryman patent uses hook and loop material to attach the pouch to the sides of the crutch, the pouch must either be provided with rigid sides, or not be over filled, to prevent the hook and loop material from separating. The use of securing means proximate the top of the pocket allows disclosed pockets to be "over-stuffed", if required, without being concerned that the pouch will separate from the crutch. Additionally, the nature of the '749 design restricts the width of the pocket which is too narrow for comfortable, easy access to articles at the bottom of the pocket. Average adult hands are too large for easy access to the pockets contents and the pocket would have to be removed and the contents, such as keys, lipsticks, etc. spilled out. The constant removal and attachment of the pocket would quickly deteriorate the adhesive holding the loop material to the crutch sides.

Similarly, several devices have been described for attachment of carrying devices to wheel chairs. In U.S. Pat. No. 4,339,061 Dunn discloses a box-like accessory case for mounting to the armrest of a wheel chair. The Dunn patent uses stiff material such as cardboard on the sidewalls of the box-like container to give the walls their shape and to prevent sagging. This stiffness suffers from the problem of inflexibility when small items are placed in the case as the case retains its shape and is unable to collapse. Addition of cardboard further prevents the case from being easily washable thus preventing cleaning in the face of mud, water and other contaminants that would be splashed on the case during normal use. Further means for attaching the case to the wheel chair arm rest are insufficient to prevent theft of the case from the chair should it be unattended.

In U.S. Pat. No. 4,577,903 Wells describes an attachment for a wheel chair that is supported vertically from the rear handles of the chair. Rear-attached pouches are difficult for a wheel chair-bound person to access as they are almost totally beyond the reach of the wheel chair occupant from the seat of the wheel chair. Further, means for protecting against theft of the attachment or items contained therein is lacking and the occupant takes certain risk of theft when using the device.

Sanders, in U.S. Pat. No. 5,154,331 describes a combination of a device for storage of items under the arm rest of the wheel chair and padding to make the device more comfortable. Their solution against theft is to make the arm rest more comfortable by padding it so that the occupant will continuously rest his/her arm against the device(s). As persons in wheel chairs are using their arms constantly when in motion, this solution remains effective only while said persons are at rest. Theft during movement as in the common "purse snatcher" is not prevented effectively by Sanders.

Several devices have been described to provide means for carrying articles while using an invalid walker. In U.S. Pat. No. 3,957,071 Kenner describes a carrier attachment suspended to one side of the top frame member of a walker. This device combines a rigid supporting tray-like section with a hanging pocket or pouch and is connected by suspension straps encircling the frame member of the walker. Stability is afforded through only the tray-like section and no apparent stabilizing straps are described other than those which encircle the upper frame member. This device suffers from a lack of stability and may swing back and forth while in use, impacting the user and potentially distracting him/her from obstacles. Further the device does not address theft and may be easily removed by a thief.

In U.S. Pat. No. 4,184,618 Jones describes a caddy for attachment to a walker suspended to the walker frame member by two or more hangers or hooks. Again the caddy is a box-like, generally rigid compartment comprised of molded polyethylene, vinyl or a similar plastic. The device is easily removed by means of the attachment hangers or hooks and provides no protection against theft. Further the stability of the caddy is limited by a lack of stabilizing straps along the sides of the caddy for attachment to a vertical frame member of the walker thus the caddy may swing similarly to the problem of Kenner.

In U.S. Pat. No. 4,676,416 Harmon describes a carrier for a walker made of washable material and attached by fastening means to the upper frame member of the walker. The flexible material is made rigid through the addition of a rigid board member removable mounted in the bottom panel of the pocket. Again, theft and stability are not addressed in the design of the carrier.

In U.S. Pat. No. 4,815,764 Carpenter describes a foldable carrying device detachably mounted to the back of a child's stroller of the type having both upper and lower crossmembers. Closure means of Velcro®, or other hook and loop fastener systems are described to attach the device to the upper and lower crossmembers of the stroller providing stability but protection against theft is not considered.

In U.S. Pat. No. 4,830,238 Widinski describes a carrying device for retaining articles on the handle of a mobile apparatus such as strollers. The device is limited to placement on the handle of the mobile apparatus and provides no protection against theft and no stability.

Woods, in U.S. Pat. No. 5,340,005 and its various divisional patents (U.S. Pat. Nos. 5,511,710 and 5,513,789) describes fabric accessories for crutches and walkers. The preferred embodiment provides safety through use of reflective material and expandable/contractible pockets through use of pleats and elastic members. These devices are meant as covers for the crutch or walker and are attached first by placing the leg of the walker/crutch through an opening then sliding the device up the length of the ambulatory aid to completely enclose the aid. While security and stability are provided in the difficult placement of the accessories, they are complicated to use and do not provide the same ease of attachment and removal that is described herein.

SUMMARY OF THE INVENTION

A pocket system is disclosed which allows people to carry articles while using ambulatory aids such as crutches, wheelchairs and/or walkers. The pocket system is sufficiently versatile to be used as a carrying aid for child's strollers, carriers for children, bicycles, canoes and backpacks of varying sizes and construction. Further the pocket system is provided with greater security and stability to prevent theft and to reduce impact on the articles contained therein and impact on the user.

In one embodiment, the pocket system consists of a front panel and a back panel secured to one another along three sides, leaving an open end. A flap may be added to the back panel to provide a closure for the open end. The pockets can have a tailored configuration or a soft pouch design. In another embodiment, the pocket has at least one side panel positioned between the front and back panels. The back panel can have a length greater than the length of the front panel and the width of the side panel to form a closure flap, which extends over the open end. To provide for expansion, the side panel and/or front panel can be gusseted. For crutches, the width of the pocket will be such that it will fit in between the vertical side rails on a standard crutch. For a walker, the width of the pocket will be such that it can fit snug or loose under the horizontal U-shaped bar that is attached at the top of commonly used walkers. For a wheel chair, the pocket width and length will be such that it can fit under the arm rest and not impact the wheel or wheel grip. However, the pocket can be attached anywhere and is not limited to the arm rest.

An additional pocket can be attached directly to the front panel of the pocket on three sides leaving one side open to hold small items, thereby allowing rapid, easy access to frequently used small items such as pens or pencils. A key ring may be added to this smaller pocket or on the pocket itself. This smaller pocket may be gusseted or pleated to provide an attractive appearance.

A stabilizing strap affixed to the pocket adjacent to the closed end has a length sufficient to secure the pocket to any available vertical cross brace either on one side or on both sides. The retaining strap preferably has a length sufficient to wrap around a vertical cross brace. Alternatively more than one retaining strap may be affixed to the pocket adjacent to the closed end and each tipped with means for attaching the straps around the crutch vertical side rails. Said means for attachment of the stabilizing straps can be Velcro®, or other hook and loop fastener, metal or plastic snaps, buttons and button holes or eye hooks and ties or a combination thereof. A separate stabilizing strap tipped with means for attachment can be added to extend the pocket retaining strap to fit onto thicker vertical members, for example, the circumference of men's or women's pant legs, may be added so the pocket can be attached to a belt or belt loops in pants and stabilized against the thigh.

In another embodiment, the back panel has a length at least twice the length of the front panel. The back panel is folded upon itself to form a U-shape, a first leg being affixed to the front panel. An enclosing strip is secured to the crook of the U-shape to form a channel dimensioned to receive the retaining bolt used to secure the pocket to the crutch. A secondary layer is affixed to a second leg of said U-shape to form a second pocket, with access being provided to the second pocket through the second leg. Separate closure can be provided for the open end of the pocket. A retaining strap is secured to the pocket adjacent to the closed end to secure the pocket to the crutch. A document retaining strap can be incorporated which allows for long documents to be placed in the lower pocket and prevented from wobbling through use of the adjustable strap. The document retaining strap is wrapped around the sides of the crutch and secured through the use of a hook and loop material.

Where Velcro® is used as means for attachment, additional strips or large sections of Velcro®, such as rectangular strips or squares, may be attached to the back panel to provide flexibility for linking the stabilizing or attaching straps. Further, where Velcro® is used as means for securing straps, the straps themselves can be tipped with a length of Velcro® or Velcro® attached to a non-fraying material that is larger than needed to provide flexibility for the users in customizing the fit of the pocket. The user may then cut the Velcro® down to fit the need.

The pocket system has at least one pocket having an open end. At least one pocket securing member is attached to the back of the pocket proximate the open end. A stabilizing strap, or straps, is affixed to the back of the pocket proximate the closed end. Generally these straps extend from opposite sides of the pocket for maximum security. One end of the securing members(s) and strap(s) can be permanently secured to the pocket, with the open end removably affixed through various means known in the art. Alternatively all of the methods of attachment of the pocket securing member(s) and stabilizing strap(s) can be removable.

BRIEF DESCRIPTION OF THE DRAWINGS

The advantages of the disclosure will become more apparent when read with the specification and the drawings, wherein:

FIG. 8 is a walker with a pocket embodiment attached;

FIG. 10 is a side view of the hook and loop attachments;

FIG. 11 is a side view of the disclosed pocket having a channel; and.

DETAILED DESCRIPTION OF THE INVENTION

Figure 1:
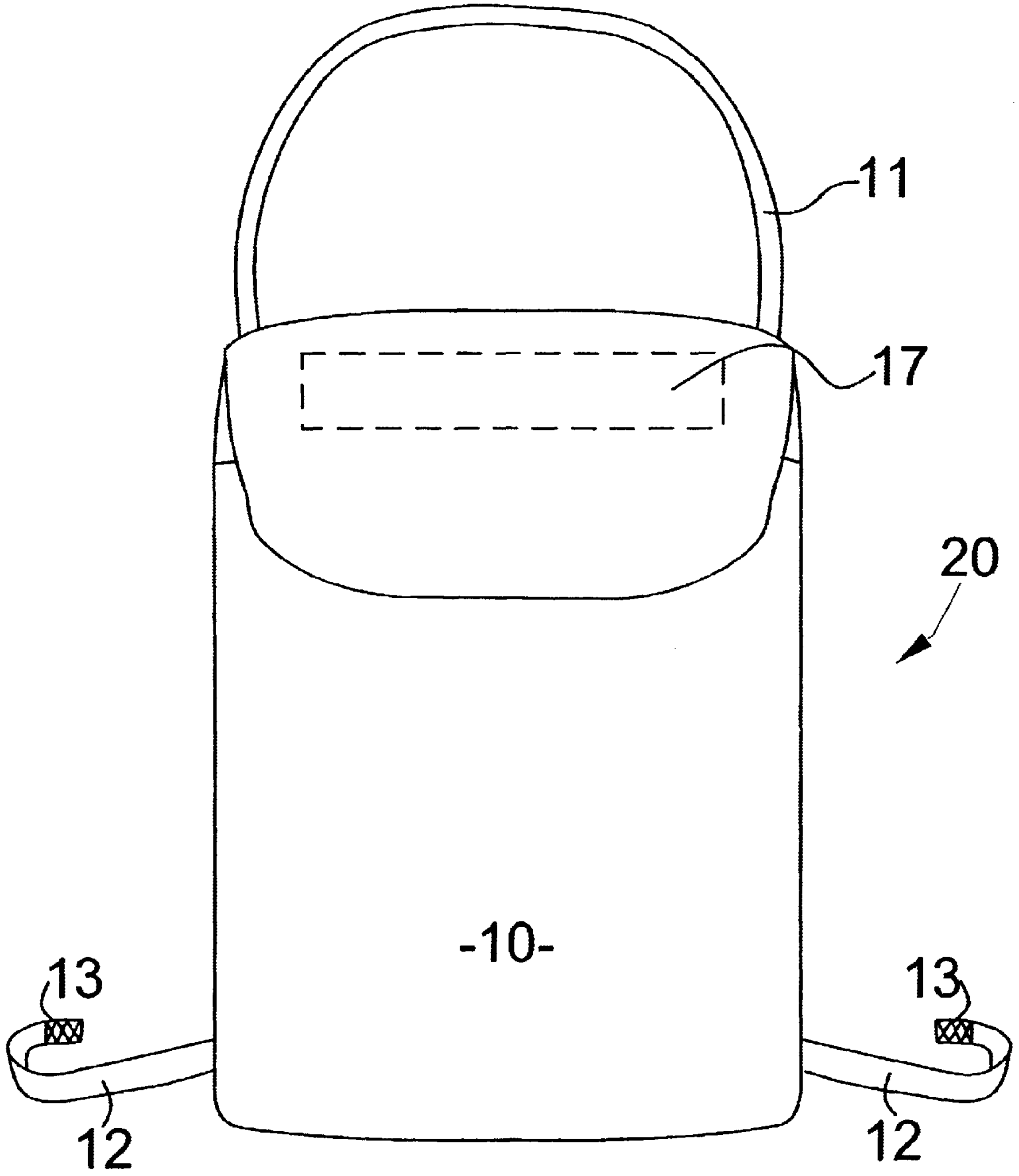
FIG. 1 is a front view of a pocket with a continuous loop for attachment and stabilizing straps.

The foregoing problems are overcome by the invention by providing a pocket that is easily used, versatile and requires little or no alteration to the device onto which it will be attached. By suspending the pocket from one or more junctions of a horizontal and a vertical member on the device, stability is provided. Versatility in the point of attachment allows the user to attach the pocket as securely as needed or desired. In one embodiment, the inclusion of the continuous loop attachment affords theft protection by providing the user with means for creating a slipknot.

Because the pockets require only a single attachment point in the form of a stable vertical or horizontal post or brace, it is adaptable for many uses. When one or more vertical and horizontal posts or braces meet, the pocket is able to provide a high level of security and stability. The standard crutch has a pair of vertical side rails with a horizontal top rail, at least one pair of holes drilled in each of the vertical side rails, and a horizontal handgrip. The pocket is capable of attaching at as many as four points on the standard crutch but is designed to work on one, two or three points of attachment as well. The standard walker has an upper U-shaped member which is connected to rectangularly disposed members and may or may not contain intermediate cross braces or members or wheels. The pocket has several attachment points to a walker and provides the user with better control over placement. A single point attachment can occur anywhere on the upper U-shaped member while two and three points of attachment at the junctions between the U-shaped member and the rectangular members are available and within reasonable reach, ease of use and unencumbered. The standard wheel chair has many cross braces on the sides, back and front, several of which are suitable for single or multi point attachment of pocket. All other described uses for the pocket can be shown to have sufficient vertical and horizontal members and cross braces for single or multi point attachment of the pocket. In all cases, the user has the ability to customize and change the number of attachment points to suit the immediate need.

The attachment of the pockets to backpacks and child carriers is dependent upon the construction of the receiving device. The versatility of the pockets enables attachment to most devices. Further, the versatility enables the same pocket, or group of pockets to be used on many devices.

It can be seen from the following figures and descriptions, that the pockets can take various forms, such as soft and unstructured or more tailored and structured. By structured or unstructured, it is intended that the term refer to the design having or lacking a specific contour and not to show presence or absence of material rigidity. The pocket can be made of any soft, flexible material such as hemp cloth, cotton cloth, polyester cloth and blends, nylon and nylon blends, silk, wool, denim, canvas or netting and are preferably washable and durable. A flexible, waterproof insulating material can be placed inside of the pocket to assist in retention of temperature for hot or cold drinks carried inside the pocket.

Additionally, the exact methods of construction illustrated herein are used as examples only and other methods of stitching, trim and panel to panel overlay will become apparent to those skilled in the art.

Figure 2:
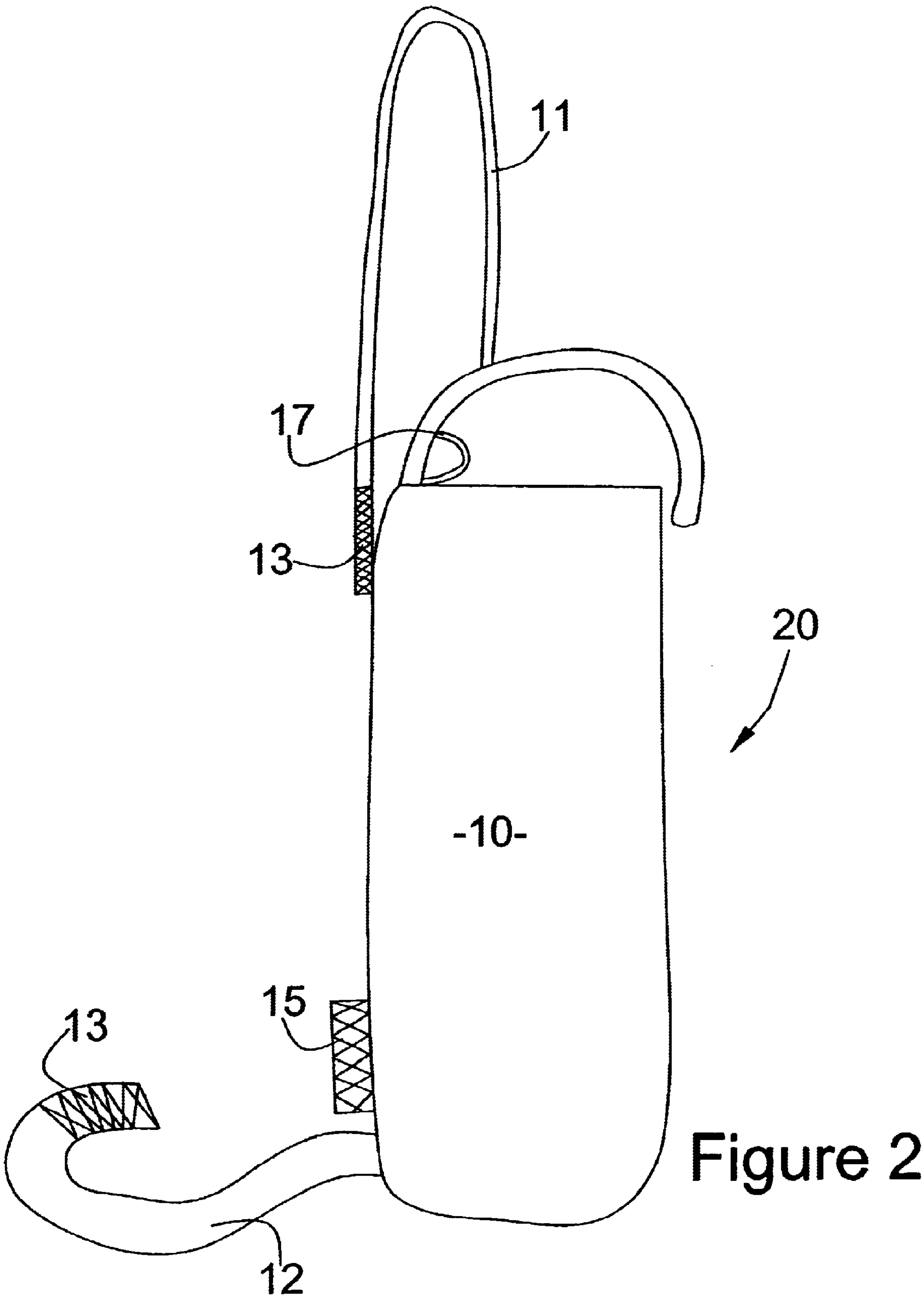
FIG. 2 is a side view of the structured pocket of FIG. 1.
Figure 3:
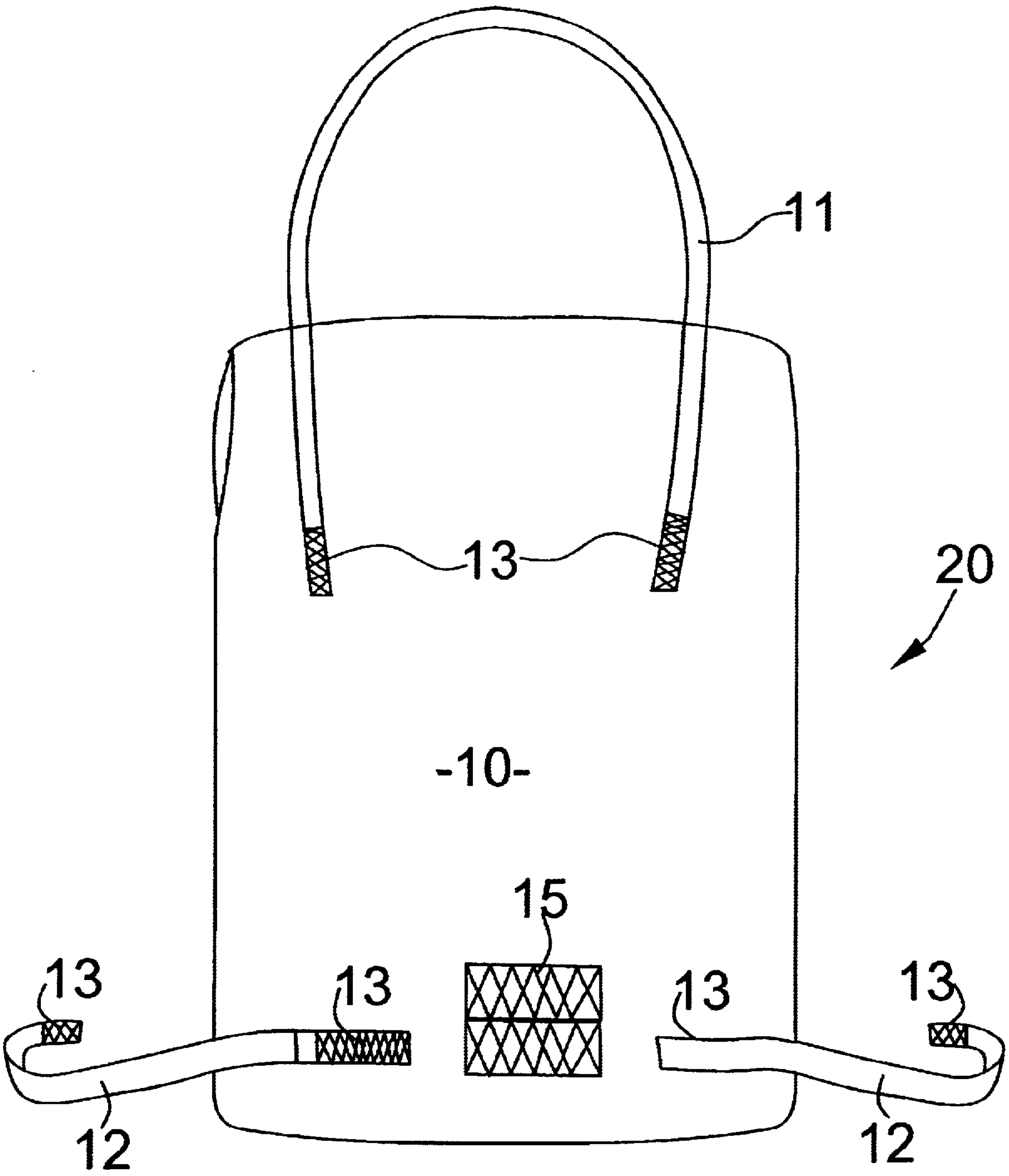
FIG. 3 is a rear view of the structured pocket of FIG. 1.

The pocket assembly 20 illustrated in FIG. 1, comprises a pocket 10 of front, side and back panels which has one open end for the placement of articles. In this figure, a flap covering is shown however the top can be left open or close through other means. The pocket 10 has a continuous attachment loop 11 attached to the top portion of the back for attachment to a horizontal member. When the pocket assembly 20 is attached to the upper portion of a crutch, the attachment loop 11 in this and other embodiments, is generally placed between the rigid frame of the crutch top and the rubber pad. A retaining channel 17 is affixed to the back of the pocket 20 to enable the pocket to be affixed below the hand grip, as illustrated in more detail in FIG. 7. The placement of the attachment loop 11 in relation to the top of the pocket 10 will be dependent upon the final use, however the strap 11 should be positioned to enable to pocket 10 to hang vertically from the horizontal member. The pocket 10 has two stabilizing straps 12 with attachment members 13 at the ends opposite the pocket 10. The stabilizing straps 12 can be permanently stitched to the pocket 10 at one end or can be attached by Velcro®, as illustrated herein, snaps, buttons etc. so that they can be removed when not in use. FIG. 2 shows a side view of the pocket assembly where the pocket 10 has the continuous attachment loop 11, the stabilizing straps 12, retaining channel 17 and the attachment members 13. FIG. 3 more clearly illustrates the rear view of the pocket assembly shown in FIG. 1 and the strap attachment member 15 attached to the back panel for attachment of the stabilizing straps 12. The strap attachment member 15 would be the opposing Velcro®, or other attachment method, from the attachment member 13. In this embodiment, all straps are fastened to the pocket back 10 by attachment members 13 and 15, however, all or some of the straps can be permanently fastened to the pocket 10. Although the attachment members illustrated herein are predominately Velcro®, it should be noted that many other methods of attachment, such as buttons, ties, snaps, or other methods available at the time of manufacture can be substituted. The decision as to permanent or removable straps will be dependent upon the end use and will be obvious to those skilled in the art. The ability to remove the straps from the pockets provides the advantage that the unused straps can be totally removed and easily replaced for use when needed.

Figure 12:
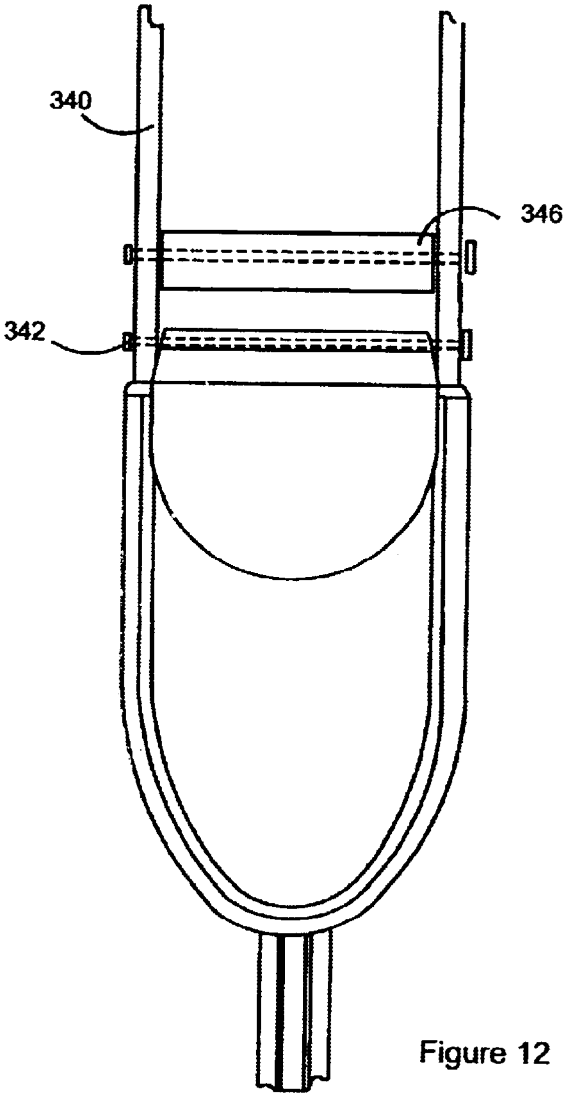
FIG. 12 is a partial front view of a crutch with a pocket affixed through use of a retaining
Figure 11:
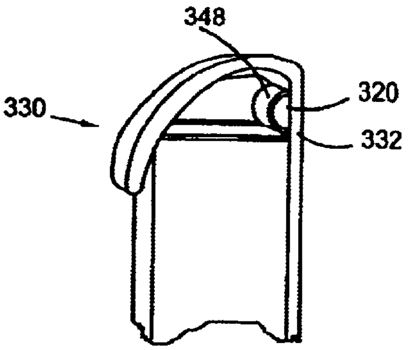

A preferred embodiment illustrated in FIGS. 11 and 12 has a channel 320 that is preferably placed on the inside of the back panel 332 which provides the user with the ability to use the pocket 330 on either the upper or lower portions of the crutch 340. The channel 320 is formed by affixing an enclosing strip 348 to the interior of the back panel 332 through any method applicable to the materials being used. To secure the pocket 330 on the lower half of the crutch 340, a retaining bolt 324 is placed through the channel 320 and secured. The existing holes in the crutch 340. The pocket retaining member 342 is placed below the hand grip 346 and uses holes that pre-exist in crutches to permit adjustment of the handgrip 348. The pocket retaining member can be a bolt, dowel or other equivalent. In some instances, where the user has an arm length that requires use of the lower handgrip position, an additional pair of holes will need to be drilled to allow for use of the pocket 348.

Figure 4:
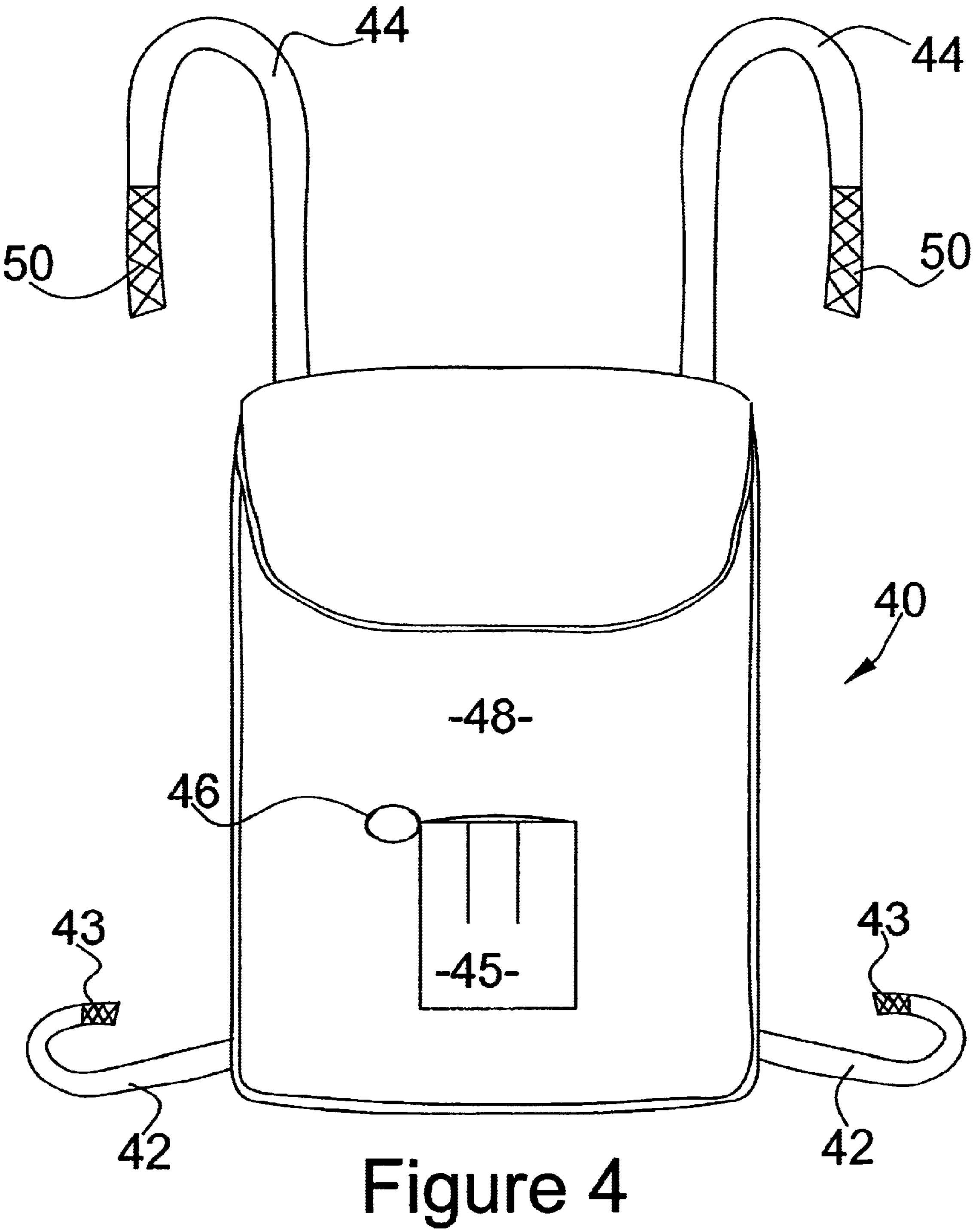
FIG. 4 is a front view of a pocket with two straps for attachment spaced at the edges of the back panel, stabilizing straps and an additional smaller pocket attached on the front.

Another embodiment of the pocket system is shown in FIG. 4 wherein the pocket 40 has the stabilizing straps 42 and attachment members 43 in combination with individual attachment straps 44 with one end loose and one end fastened to the pocket body 48. As stated heretofore, the attachment of all straps to the pocket body can be through either permanent or removable methods. The attachment straps 44 have attachment members 50, which in this illustration are Velcro®, that interact with coordinating attachment members affixed to the pocket body 48 to enable the pocket 40 to be attached to an end device. The pocket 48 includes a small pocket 45 permanently attached, in an accessible position, to the body 48 on three sides. In this illustration the top of the small pocket 45 is left open to facilitate the placement of articles such as pens or pencils, however one or more small pockets can be placed on the front of the pocket 40 with or without top closures. The addition and number of small pockets will depend upon the final use and will be obvious to those skilled in the art. A key ring 46 is attached to the small pocket 45, although the ring can be placed in any convenient location. The placement of the key ring 46 approximate the small pocket 45 enables the user's keys to be kept out of sight in the pocket 45. Key loops with chains or clips can also be incorporated with any of the pocket embodiments disclosed herein.

Figure 5:
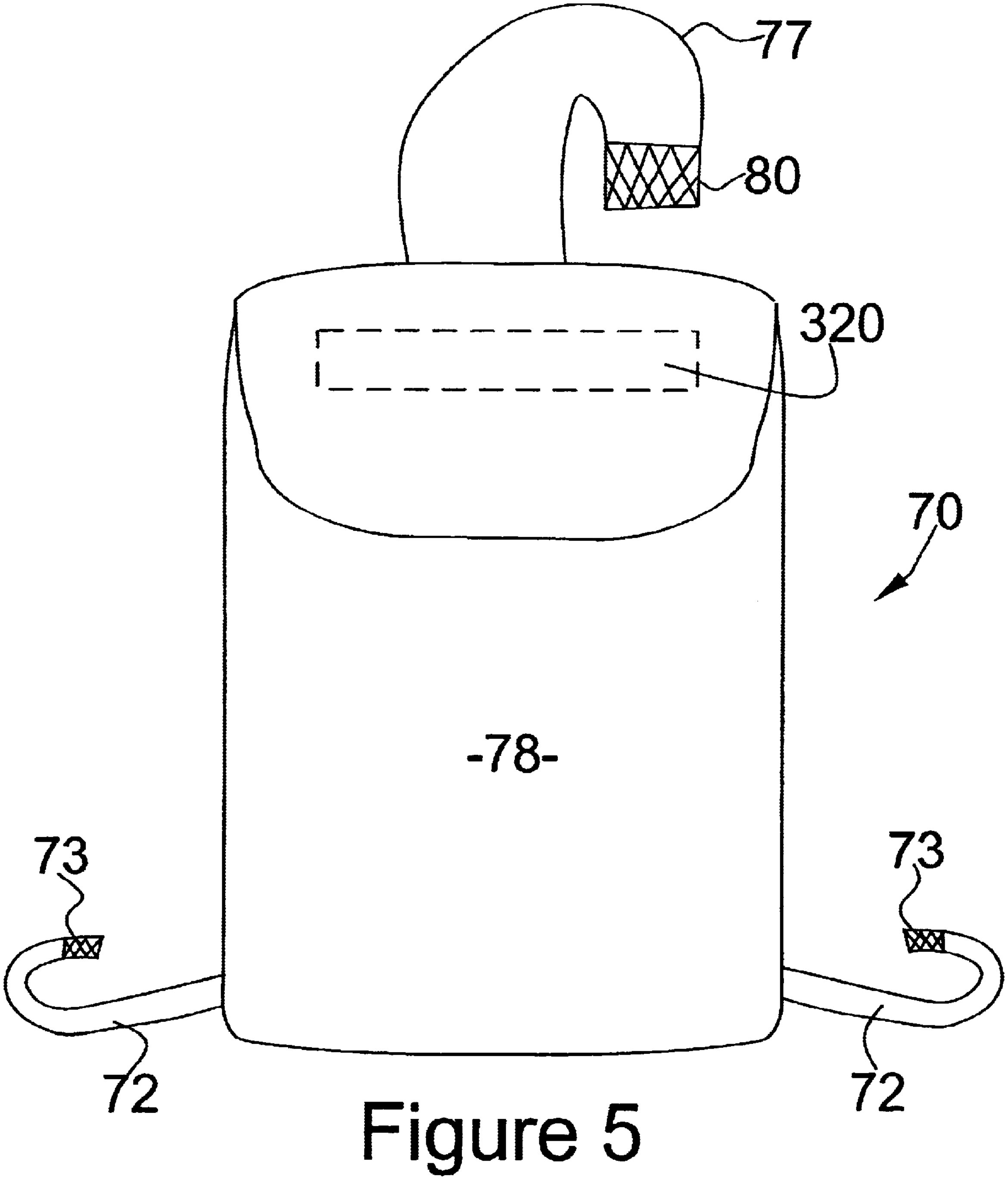
FIG. 5 is a front view of a pocket with a single large strap for attachment centered at the edge of the back panel and stabilizing straps.

A further embodiment of the pocket system is shown in FIG. 5 wherein the pocket 70 has the stabilizing straps 72 and attachment members 73. Instead of two attachment straps, this embodiment has a single, wider attachment strap 77 secured to the body 78 with the end being provided with an attachment member 80. This single, wide attachment strap 77 can be placed anywhere on the top of the back panel of the pocket body 78 and, as noted heretofore, can be a permanent or removal connection. Additionally, the pocket 708 has a retaining channel 320 to enable the pocket 70 to be attached, through use of a retaining bolt, to the lower portion of the crutch, a sufficient distance from the lower hand grip to avoid interference. In the rear view of FIG. 6, the attachment members 73 and 82 are illustrated secured to the back of the pocket 70. The stabilizing straps 72 are secured to the attachment member 73 which, as illustrated in this embodiment, is the hook and loop Velcro®. The wide attachment strap 77 is attached to the back of the pocket body 78 with the interactive attachment members 80 and 82. Velcro® provides an advantageous method of attachment by enabling individual adjustability by placing increasing the size of the body attachment member 82, permitting the strap attachment member 80 to be adjusted along the length of the body attachment member 82. In order to provide additional adjustability, the attachment strap 77, as well as the attachment straps in other embodiments disclosed, can be adjustable. The adjustability can be accomplished by lengthening or shortening the strap itself or by providing Velcro® along about one third, or more, of the strap, enabling the strap to be secured any place along the Velcro® length.

Figure 6:
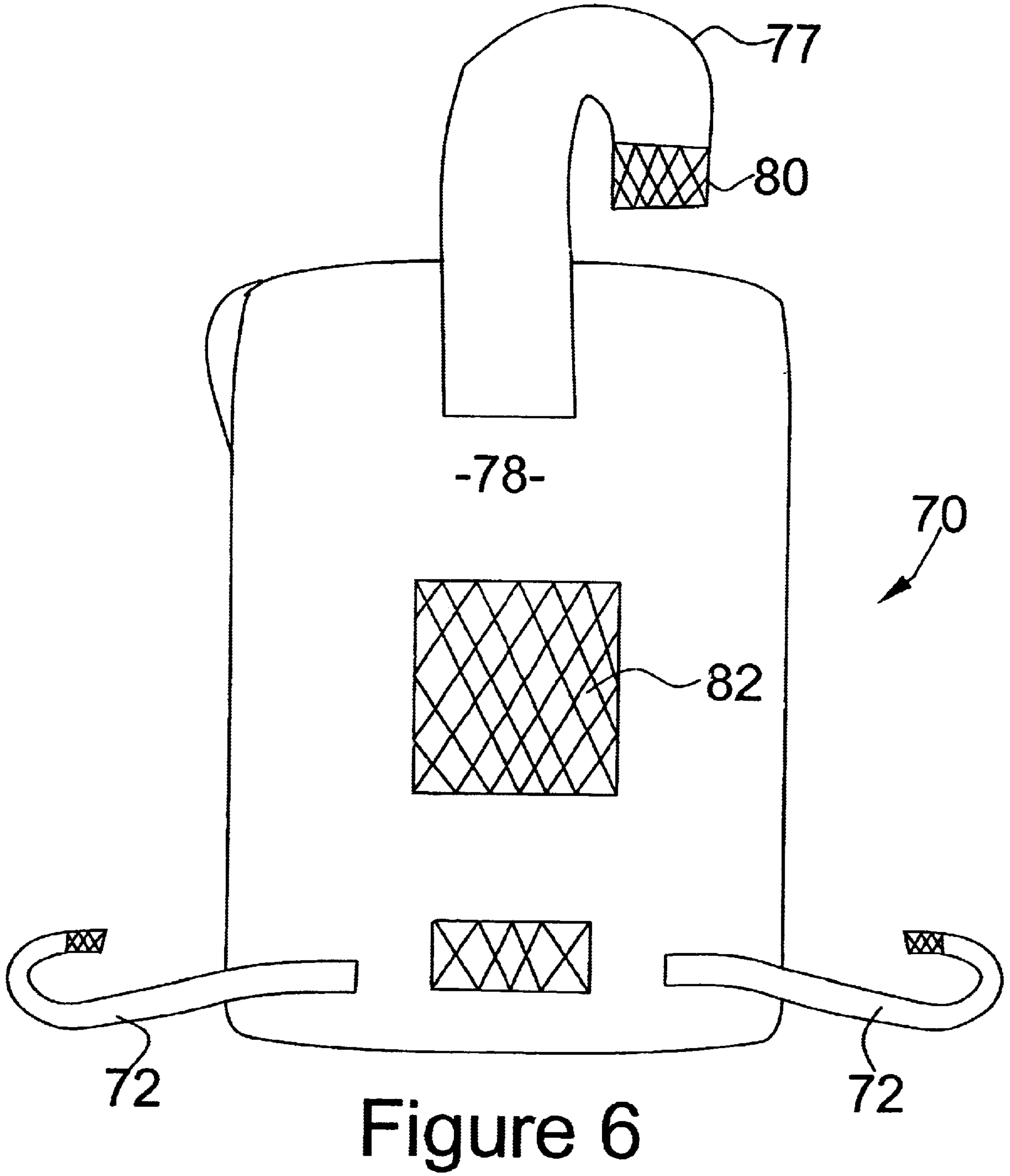
FIG. 6 is a rear view of the structured pocket of FIG. 5.
Figure 7:
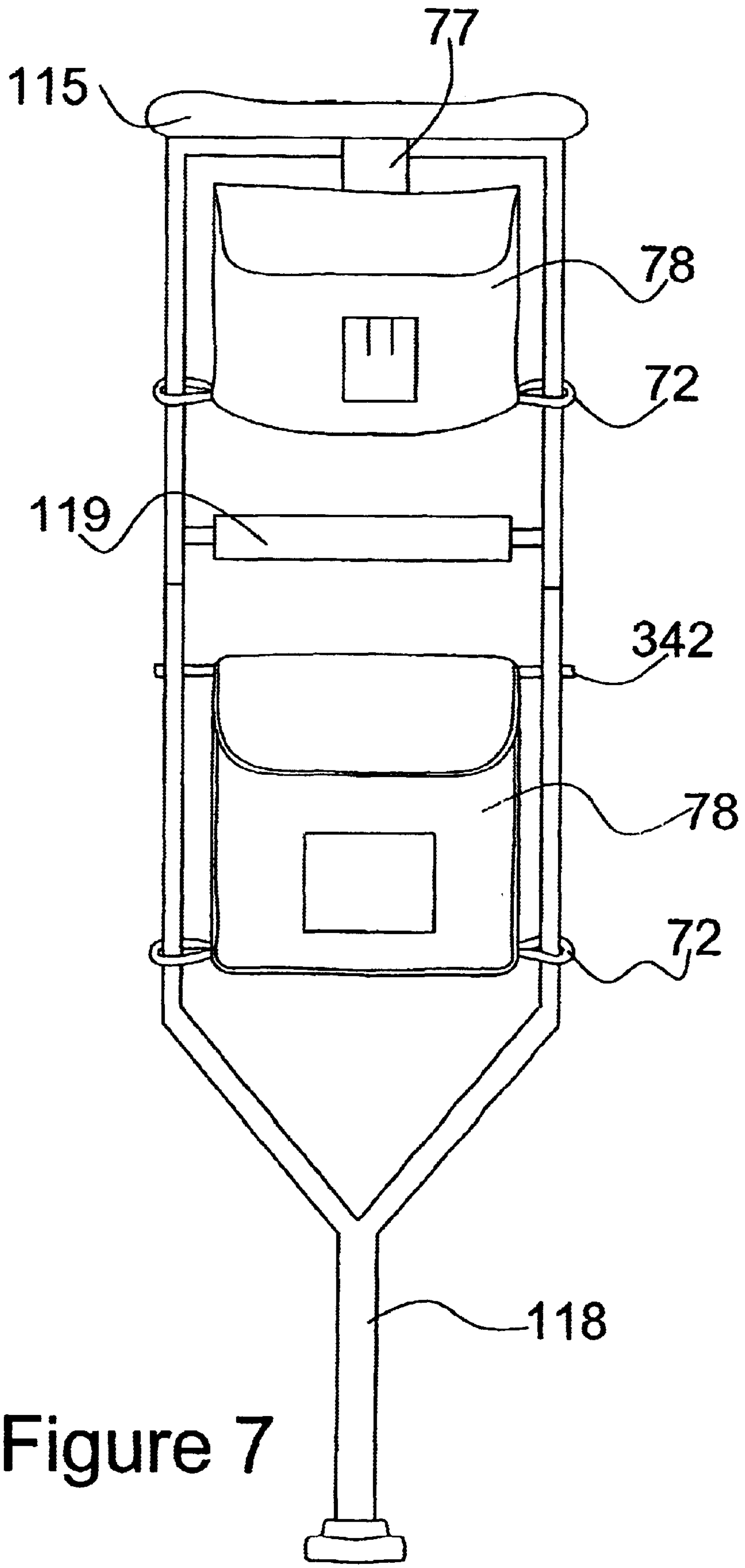
FIG. 7 is a crutch with two pocket embodiments attached.

FIG. 7 shows one combination of pockets on a standard crutch. The pocket 70 of FIG. 5 has been placed on the upper portion of the crutch 118 with the strap 77 placed under the rubber arm rest pad 115. The pocket 77 is stabilized through the use of the two stabilizing straps 12. The pocket 70 is also able to be placed on the lower portion of the crutch 118 by incorporating a retaining bolt 324 which is placed through the retaining channel 320 below the lower hand grip 119. The lower portion of the pocket is again stabilized through the use of the stabilizing straps 12. When the pocket 70 is attached through use of the retaining channel 320, the strap 77 is secured to the Velcro® 82 as illustrated in FIG. 6 to maintain the strap 77 in a fixed position. In FIG. 8 the pocket 130 is shown attached to a standard walker 20.

Figure 9:
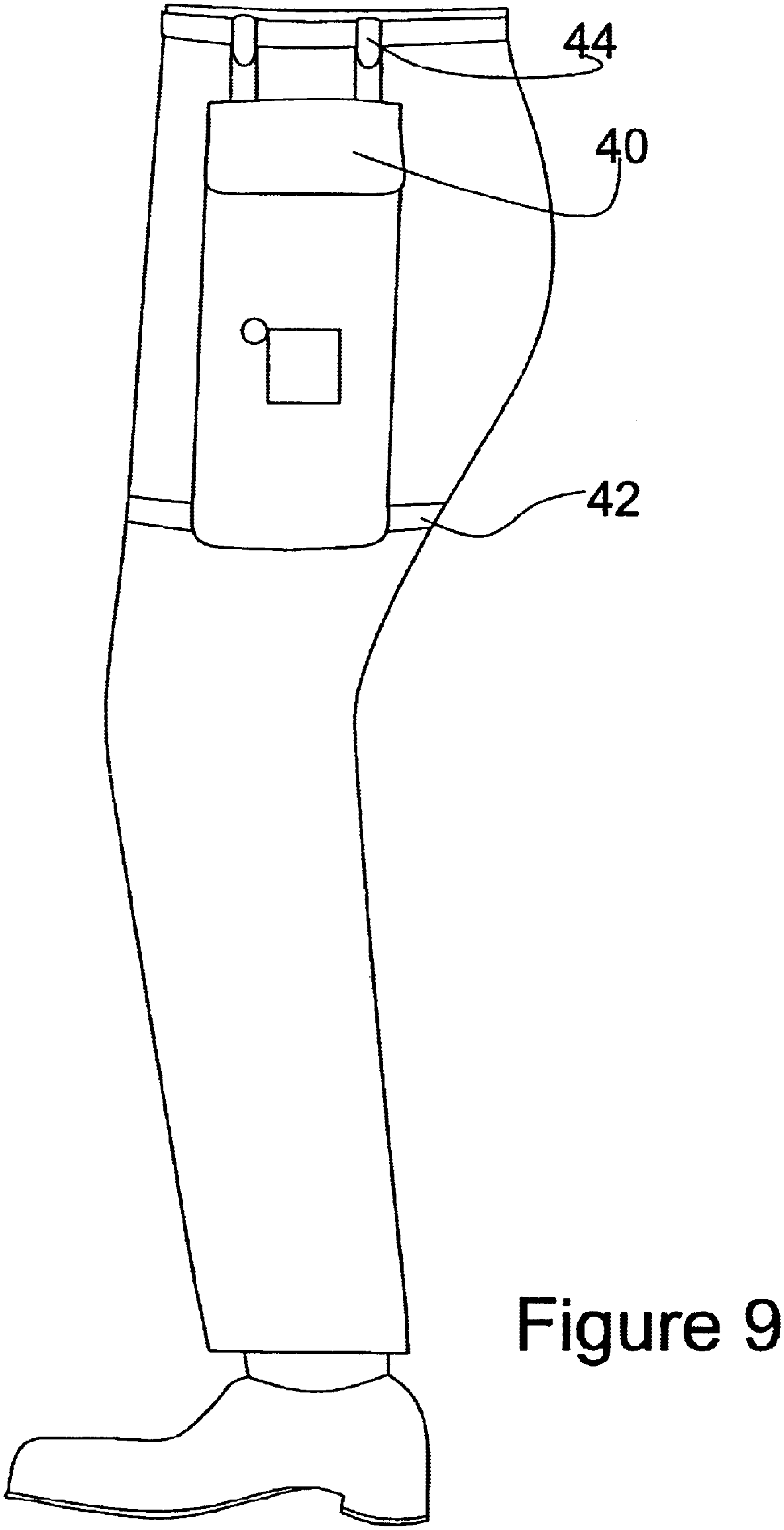
FIG. 9 is a side view of a person wearing the disclosed pocket affixed to a belt.

The attachment straps 44 of the disclosed pocket 40 can also be placed on the user's belt and the stabilizing straps 42 placed around the leg to maintain the pocket 40 adjacent the leg, as illustrated in FIG. 9. When Velcro® is used as the attachment member, an intermediate connecting piece will be required to enable the Velcro® to adhere, as well as in some instances fit around the user's leg. Alternatively, the Velcro® on the stabilizing straps 102 and 106, can be directly attached to one another by adding a strip of loop material 108 on the opposite side of the stabilizing strap 106. This enables the hook material 104 on the strap 102 to adhere to loop material 108 on strap 106. As illustrated in FIG. 10, the straps 102 and 106 can still be adhered to the back of the pocket as disclosed heretofore. Other methods of affixing the device, such as buttons, snaps, etc., will require different interactive members and will be obvious to those skilled in the art.

At least one stabilizing strap is recommended for the pockets to reduce swing of the pockets while walking. It should be noted that any of the features described in conjunction with any of the specific embodiments can be incorporated, in any combination, with any of the other embodiments. The disclosed pocket system has the ability to be self-securing, that is they are secured to the pocket rather than to the device or support surface, whether the support surface is a crutch, backpack or belt. Thus, when any of the foregoing are used with crutches the top rubber arm grip adjacent the armrest frame can be removed, the straps placed between the grip and the crutch frame and the grip replaced. This prevents any alterations to the crutch being required.

What is claimed is:

1. A crutch and pocket system combination for retaining articles, said crutch having a pair of vertical side rails connected by a top arm frame and a top arm pad removably secured to said top arm frame and a handle there below, said system having:

at least one pocket being attached to said crutch, a first of said at least one pocket having:

an open first end and a closed second end, a front panel, a back panel, said back panel having an interior side and an exterior side and securing means, and a pair of side panels, a pocket closure member being affixed to said back panel and extending over said open first end;

a first pocket channel member, said first pocket channel member being secured to said back panel interior side and being dimensioned to receive a pocket retaining member, at least one connection strap, said at least one connection strap having a first end affixed to said back panel adjacent to said open end and a second end having securing means to enable said second end to be secured to said back panel securing means, said at least one connection strap being dimensioned to be received between said top arm pad and said top arm frame, wherein, said first pocket being configured to be alternatively secured to said crutch through said at least one connection strap or being secured to said crutch by said pocket retaining member being placed within said channel member and affixed to said vertical rails.

2. The pocket system of claim 1 further comprising at least one stabilizing strap, a first end of said at least one stabilizing strap being affixed to said pocket proximate said pocket closed second end and a second end of each of said at least one stabilizing strap having a securing member.

3. The pocket system of claim 2 wherein said at least one stabilizing strap securing member can be affixed to said pocket proximate said stabilizing strap first end, thereby forming at least one stabilizing loop to be attached to said crutch side rail.

4. The pocket system of claim 2 wherein a first of said at least one stabilizing strap securing member is attachable to a second of said at least one stabilizing strap securing member to form a loop.

5. The pocket system of claim 1 wherein said pocket retaining member extends between said side rails and spaced from said crutch hand grip, said pocket retaining member being substantially parallel with said arm pad.

* * * * *